United States Patent [19]

Notaras et al.

[11] Patent Number: 4,625,783
[45] Date of Patent: Dec. 2, 1986

[54] PROTECTIVE COVER

[76] Inventors: John A. Notaras; Angelo L. Notaras, both of 15-21 Reynolds Street, Balmain, New South Wales, 2041, Australia

[21] Appl. No.: 466,509

[22] Filed: Feb. 15, 1983

[30] Foreign Application Priority Data

Feb. 17, 1982 [AU] Australia .............................. PF2744

[51] Int. Cl.$^4$ .......................... B67B 17/00; F16P 1/02
[52] U.S. Cl. .................... 150/52 R; 30/122; 30/382; 30/500; 74/608; 74/612
[58] Field of Search ...................... 150/52 R; 206/349; 30/151, 381–384, 122, 286, 500; 74/606 R, 608, 609, 612

[56] References Cited

U.S. PATENT DOCUMENTS

| | | | |
|---|---|---|---|
| 2,432,567 | 12/1947 | Forrest | 30/382 |
| 2,675,835 | 4/1954 | Kiekhaefer | 30/383 |
| 2,826,294 | 3/1958 | Nicodemus | 206/349 X |
| 3,019,751 | 2/1962 | Fichera | 74/612 X |
| 3,129,731 | 4/1964 | Tyrrell | 30/382 X |
| 3,326,250 | 6/1967 | Kephart, Jr. | 30/382 X |
| 3,344,818 | 10/1967 | Musgrove | 30/151 |
| 3,382,898 | 5/1968 | Walker | 30/382 |
| 3,641,840 | 2/1972 | Rossler et al. | 74/609 |
| 3,977,078 | 8/1976 | Pittinger, Jr. | 30/500 X |
| 4,121,636 | 10/1978 | James | 30/122 X |
| 4,188,719 | 2/1980 | Hoff | 30/122 |
| 4,369,575 | 1/1983 | Schurman | 206/349 X |

FOREIGN PATENT DOCUMENTS

| | | | |
|---|---|---|---|
| 899116 | 5/1972 | Canada | 30/122 |
| 2134629 | 1/1973 | Fed. Rep. of Germany | 30/382 |
| 121379 | 12/1918 | United Kingdom | 30/151 |
| 986279 | 3/1965 | United Kingdom | 150/52 R |

Primary Examiner—William Price
Assistant Examiner—Sue A. Weaver
Attorney, Agent, or Firm—Ladas & Parry

[57] ABSTRACT

A protective safety cover for a power transmission chain of a chain saw power head and an attachment for the power head, having at least two fins for engagement by the cover, is provided with two grooves adapted to frictionally engage the fins to secure the cover to the attachment. The grooves are curved until the fins are located therein so that upon location of the fins in the grooves the cover is resiliently deformed to correspond to the shape of the fins thereby enhancing the frictional engagement between the fins and grooves.

6 Claims, 8 Drawing Figures

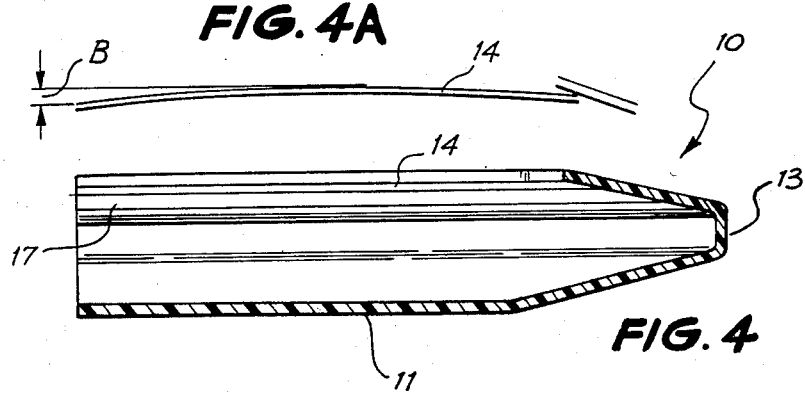
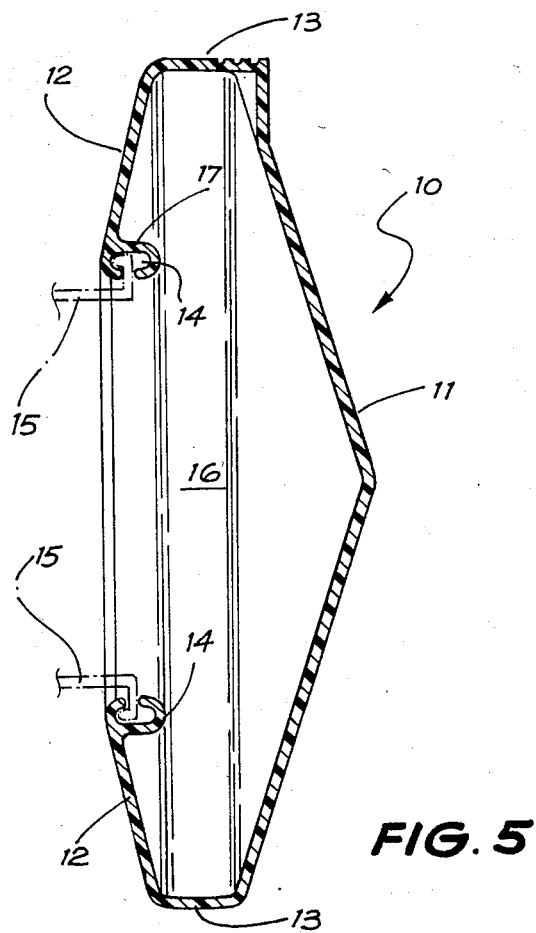

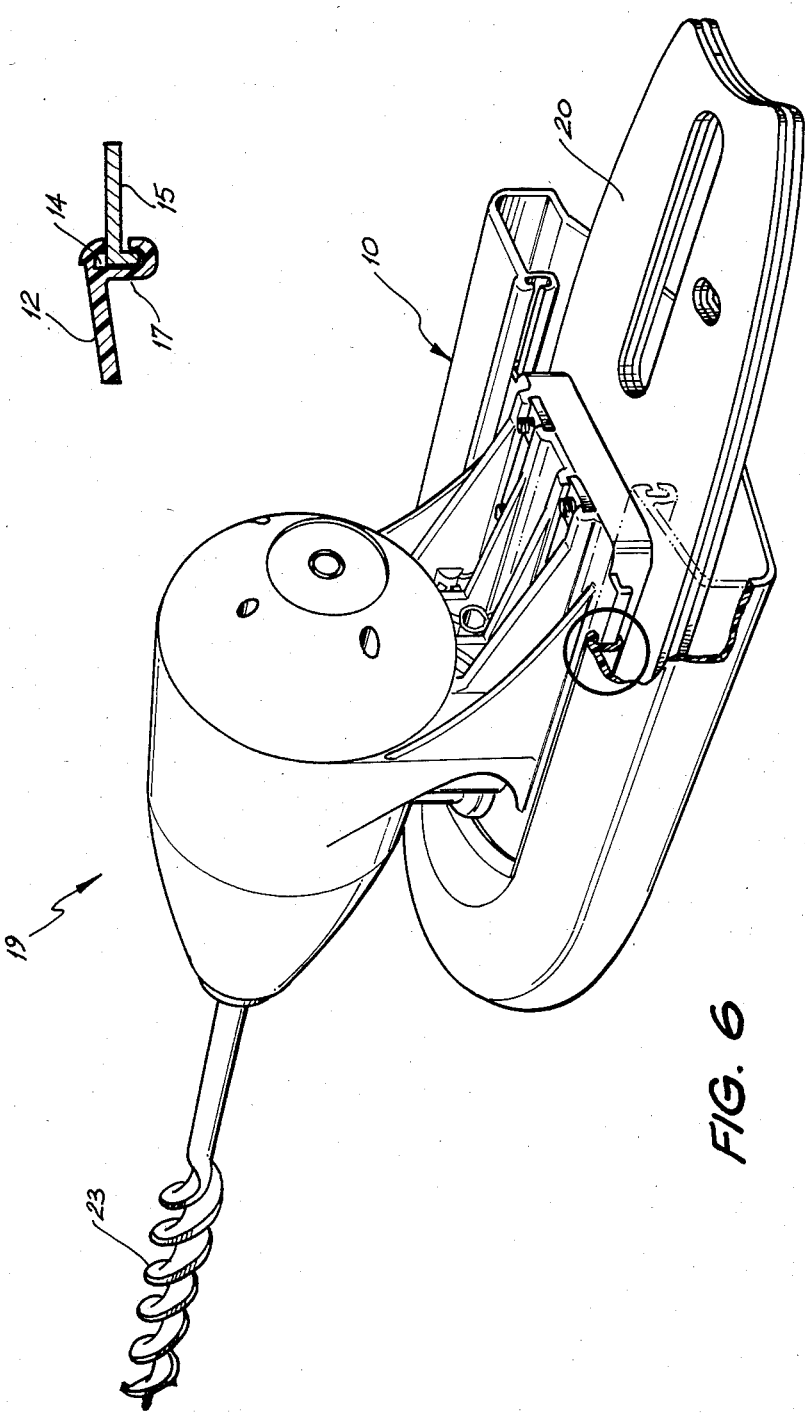

PROTECTIVE COVER

The present invention relates to protective covers and more particularly but not exclusively to protective safety covers for chain saws.

Traditionally chain saws were used mainly in the cutting of timber, however through the development of attachments for power heads of chain saws, the use of chain saws has widened in scope. The various attachments generally require use of a power transmission chain which is exposed during operation of the attachment. Although protective covers are used in similar situations to cover power transmission chains, they have several disadvantages and are not applicable to the present field.

In particular the known covers are generally of a bolt-on or snap-on configuration.

The bolt-on type of cover has the disadvantage that the bolts become loose in high vibration situations, such as the present. In some circumstances the bolts even become detached from the chain saw and become lost. Additionally, it is time consuming and tedious to attach or remove the cover due to the time required to tension or loosen the bolt. The above inhibits the use of the cover if it must be removed to adjust the tension in the chain. Still further separate tools are required to attach or remove the cover.

The snap-on variety of cover has the major disadvantage that the clips do not retain their resilience which allows the clips to fall off.

It is the object of the present invention to overcome or substantially ameliorate the abovementioned disadvantages.

There is disclosed herein a protective safety cover for a power transmission chain of a chain saw power head and an attachment for the power head, said attachment having at least two fins for engagement by the cover, said cover having two grooves adapted to frictionally engage the fins to thereby secure the cover to the attachment, said grooves being curved about an axis generally perpendicular to said groove but spaced therefrom.

A preferred form of the present invention will now be described by way of example with reference to the accompanying drawings, wherein:

FIG. 4 is a schematic sectioned side elevation of the cover of FIG. 1 along the line IV—IV; and FIG. 4A is schematic showing of the groove shown in FIG. 5.

FIG. 5 is a schematic sectioned elevation of the cover of FIG. 1 sectioned along the line V—V.

FIG. 6 is a schematic perspective view of the cover of FIGS. 1 to 5 attached to a chain saw attachment.

FIG. 6A is an enlargment of part of FIG. 6.

Figure 1:
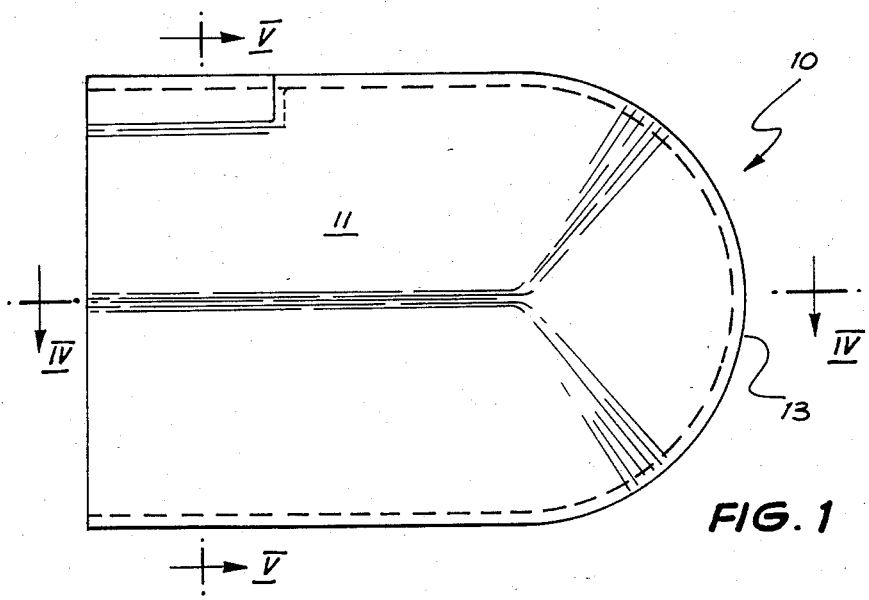
FIG. 1 is a schematic front elevation of a safety cover for the power transmission chain of a chain saw.
Figure 2:
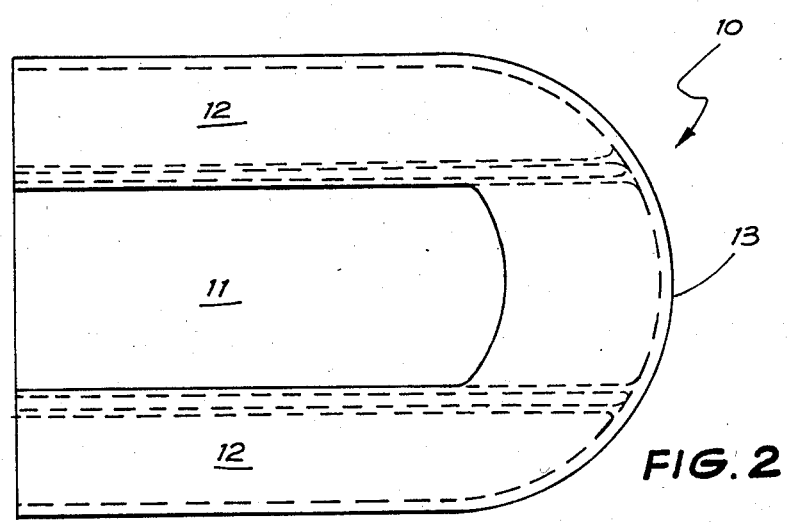
FIG. 2 is a further side elevation of the cover of FIG. 1.
Figure 3:
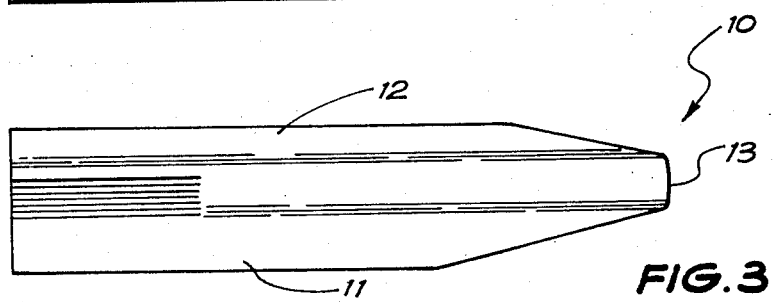
FIG. 3 is a plan view of the cover of FIG. 1.

In FIGS. 1 to 5 there is depicted a cover 10 for the power transmission chain of a chain saw power head to which is attached an attachment to be driven by the power head. The cover 10 is generally hollow and has one end face 11 opposed by a further face 12. The face 12 is curved so as to extend around the periphery of the edge portion 13. The face 12 along its periphery is provided with two C-shaped grooves 14 which are adapted to receive two fins 15 (FIG. 5) which are formed on the attachment. The fins 15 are adapted to be frictionally received within the grooves 14 so as to retain the cover 10 on the attachment.

The faces 11 and 12 define a hollow 16 which receives the blade of the chain saw together with the power transmission chain.

Now with particular reference to FIGS. 4 and 5, wherein there is schematically depicted the cover 10 sectioned along the line IV—IV of FIG. 1. The curvature in the groove 14 is schematically depicted in FIG. 4A. In FIG. 4A, the groove 14 is shown as elongated and deviating from a straight path by the distance B. In use, the portion 17 providing the groove 14 is resiliently deformed, by being straightened by the fin 15, to thereby enhance frictional engagement of each fin 15 within its respective groove 14. To enhance the resilient deformation of the cover 10, the cover 10 is preferably formed of plastics material.

It is an advantage of the above described protective safety cover that it is easily fitted and removed for chain attachment whilst still providing the further advantage that due to the resilient deformation of the cover it will be retained in position despite the high vibration applied to it by the chain saw power head.

The foregoing describes only one embodiment of the present invention and modifications, obvious to those skilled in the art, can be made thereto without departing from the scope of the present invention.

For example, the grooves 14 can be part of the attachment and the fins 15 can be part of the cover 13.

In FIG. 6, there is schematically depicted a drill attachment 19 for the power head of a chain saw. The drill attachment 19 attaches to the blade 20 of a chain saw. The attachment 19 includes a body 21 which is fixed to the blade 20 and which rotatably supports a sprocket 22. Passing around the sprocket 22 and guidably supported by the blade 20 is a power transmission chain which is driven by the chain saw power head. The sprocket 22 rotatably drives, via a gearbox, a drill bit 23. The attachment body 21 is provided with the two fins 15 (FIG. 5) which frictionally engage the cover 10 as previously described.

What we claim is:

1. A protective safety cover for a power transmission chain of a chain saw power head to drive an attachment for the power head, said attachment having at least two fins for engagement by the cover, said cover being resilient and having two elongated grooves adapted to frictionally engage the fins to thereby secure the cover to the attachment, said grooves being curved until said fins are located therein so that upon location of said fins in said grooves, said cover is resiliently deformed to correspond to the shape of said fins, thereby to enhance the frictional engagement between the fins and grooves.

2. The cover of claim 1 wherein said cover has two major side walls which are spaced and joined by an edge portion so as to define a hole to receive the chain and blade support thereof.

3. The cover of claim 2 wherein one of said side walls has a recess to allow the drive assembly of the power head to pass therethrough so as to be couplable to said chain.

4. The cover of claim 3 wherein said grooves extend along the periphery of said recess.

5. The cover of claim 4 wherein said grooves are "C"-shaped in transverse cross-section.

6. The cover of claim 1 wherein said cover is formed of said plastics material.

* * * * *